(12) United States Patent
Chinnici et al.

(10) Patent No.: US 9,812,721 B2
(45) Date of Patent: Nov. 7, 2017

(54) DUAL SEAL ANODE DRAIN / PURGE TUBE

(71) Applicant: GM Global Technology Operations LLC, Detroit, MI (US)

(72) Inventors: Anthony G. Chinnici, Utica, MI (US); Bruce J. Clingerman, North Rose, NY (US); Chad A. Dammar, Ferndale, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 215 days.

(21) Appl. No.: 14/736,890

(22) Filed: Jun. 11, 2015

(65) Prior Publication Data

US 2016/0365588 A1    Dec. 15, 2016

(51) Int. Cl.
| | | |
|---|---|---|
| *H01M 8/04223* | (2016.01) | |
| *H01M 8/04225* | (2016.01) | |
| *H01M 8/04089* | (2016.01) | |
| *H01M 8/04302* | (2016.01) | |

(52) U.S. Cl.
CPC ... *H01M 8/04268* (2013.01); *H01M 8/04089* (2013.01); *H01M 8/04225* (2016.02); *H01M 8/04231* (2013.01); *H01M 8/04302* (2016.02); *H01M 2250/20* (2013.01); *Y02T 90/32* (2013.01)

(58) Field of Classification Search
CPC ......... H01M 8/04268; H01M 8/04225; H01M 8/04231; H01M 8/04089; H01M 8/04302; H01M 2250/20; Y02T 90/32; Y10T 137/86815; Y10T 137/86509
See application file for complete search history.

(56) References Cited

U.S. PATENT DOCUMENTS

2013/0295479 A1\* 11/2013 Barter ............... H01M 8/04089
  429/429

\* cited by examiner

*Primary Examiner* — Eugenia Wang
(74) *Attorney, Agent, or Firm* — Quinn IP Law

(57) ABSTRACT

A device and method for improving cathode catalytic heating by allowing independently for a draining of a liquid and a purging of a gas in a fuel cell at cold starts via a system including an anode drain and a cathode catalytic heating system connected by a purge tube, a sump external to the purge tube, and a pintle having a closed position, a first open position, and a second open position.

20 Claims, 9 Drawing Sheets

DUAL SEAL ANODE DRAIN / PURGE TUBE

FIELD

This application relates generally to improvements in cathode catalytic heating. More specifically it relates to devices and methods for improving cathode catalytic heating by allowing independently for a draining of a liquid and a purging of a gas in a fuel cell at cold starts via a system including an anode drain and a cathode drain connected by a purge tube, a sump external to the purge tube, and a pintle having a closed position, a first open position, and a second open position.

BACKGROUND

Embodiments of this invention relate generally to improvements in fuel cell operability during conditions where moisture-prone components are exposed to temperatures where water may freeze, and more particularly to effectively managing cathode catalytic heating (CCH) upon cold starts when ice is present. Such also provides the ability to drain water and gas independently.

Fuel cells convert a fuel into usable electricity via chemical reaction. A significant benefit to such an energy-producing means is that it is achieved without reliance upon combustion as an intermediate step. As such, fuel cells have several environmental advantages over internal combustion engines (ICEs) and related power-generating sources. In a typical fuel cell, a pair of catalyzed electrodes are separated by an ion-transmissive medium in the form of a polysulfonated membrane (such as Nafion™) such that an electrochemical reaction may occur when an ionized form of a reducing agent (such as hydrogen, $H_2$) introduced through one of the electrodes (the anode) crosses the ion-transmissive medium and combines with an ionized form of an oxidizing agent (such as oxygen, $O_2$) that has been introduced through the other electrode (the cathode). Upon combination at the cathode, the ionized hydrogen and oxygen form water. The end cell electrons that were liberated in the ionization of the hydrogen proceed in the form of direct current (DC) to the cathode via external circuit that typically includes a load. The flow of this DC energy is the basis for power generation by the fuel cell.

The fuel cell stack needs to run during varying ambient environmental conditions, including those that are cold, wet or both. Left unchecked, such conditions may hamper effective fuel cell startup and shutdown. For example, during shutdown, a certain amount of water (much of which may have been generated during operation of the fuel cell system) has to be removed to ensure that ice blockage of key flowpaths is avoided and that a subsequent startup, warm-up, and drive-away are still possible even after the system has been exposed to freezing conditions. Removing water from the fuel cell's anode loop is especially difficult as it doesn't have the high gas volume and flow velocity that the cathode loop does as a way to purge any excess water. One way to facilitate anode loop water evacuation is by drawing the water directly through the ion-transmissive medium of the various fuel cells toward the cathode. Unfortunately, current methods are slow (often taking over a minute to drop anode water content to an appreciable level). This approach can also lead to excessive membrane drying out, which may adversely impact the durability of the individual fuel cells.

Another way to reduce or eliminate the chance of such flowpath ice formation is to allow some of the hydrogen from the anode loop to be introduced into the cathode loop during fuel cell system shutdown and startup; such an approach may be effected through a valve placed between the anode and cathode loops and allowed to remain open long enough (possibly for only a few seconds) to promote the hydrogen flow. During the shutdown, the valve provides a quicker path for water to leave the anode instead of the slow method of drawing water through the ion-transmissive medium. During the startup, this catalytic reaction of hydrogen and oxygen (in addition to possibly helping reduce open circuit voltage (OCV)) produces heat that may be used to raise the temperature of adjacent flowpaths and components. While this approach is more capable of promoting prompt, efficient warm-up of a fuel cell system that has been exposed to freezing conditions, the relatively large thermal mass of the valve itself makes it susceptible to ice formation and related blockage. Moreover, such valves typically include a flow-regulating opening (in the form of an orifice) that by virtue of its precisely known size is used to provide precise measurement or control functions. Unfortunately, the size and precision needed to establish its flow-regulating function also make the orifice particularly susceptible to the types of ice blockage associated with the remainder of the valve as discussed above.

Therefore systems of the art are known to have problems with ice buildup and removal. Herein methods and devices are described for solving the long-felt need for improving cathode catalytic heating and providing for independent drainage of gas and liquid in such systems.

SUMMARY

Embodiments described herein provide for a method for improving cathode catalytic heating by allowing independently for a draining of at least one liquid comprising water and a purging of at least one gas in a fuel cell at cold starts. The liquid in specific embodiments can comprise from about zero to about fifty percent water, or from about fifty to about ninety percent water, or from about fifty to about one-hundred percent water, and the liquid can include particles of ice, and impurities in particle or liquid form. Embodiments described herein can comprise providing a cathode catalytic heating system. The system can have a top to prevent dripping of water into the system. The system can comprise an anode drain and a cathode drain, coupled by a purge tube there between, the purge tube configured for the purging of the at least one gas from the anode drain to the cathode drain. The gas can be about one-hundred percent hydrogen, or can be from about zero to about ten or from about zero to about fifty or from about zero to about one-hundred percent hydrogen. In specific embodiments the gas can include oxygen. Specific embodiments include a sump external to the purge tube and configured for the draining of the at least one liquid comprising water from the sump to the cathode drain; and a pintle repeatedly moveable into and out of the purge tube, the pintle moveable between a closed position preventing the draining of the at least one liquid and preventing the purging of the at least one gas. The pintle can have a first open position allowing the draining of the at least one liquid while preventing the purging of the at least one gas from the purge tube, and a second open position allowing the draining of the at least one liquid drainage from the sump and allowing the purging of the at least one gas from the purge tube. Embodiments can include methods and devices for actuating the pintle from the closed position to a first open position and draining the at least one liquid from the sump to the cathode drain.

Additional embodiments described herein provide for a system for improving cathode catalytic heating by allowing independently for a draining of at least one liquid comprising water and a purging of at least one gas in a fuel cell at cold starts. Embodiments of such systems can comprise a cathode catalytic heating system comprising an anode drain and a cathode drain, coupled by a purge tube there between. The purge tube can be configured for the purging of the at least one gas from the anode drain to the cathode drain. The system can also comprise a sump external to the purge tube and configured for the draining of the at least one liquid comprising water from the sump to the cathode drain, and a pintle. In specific embodiments the pintle can be repeatedly moveable into and out of the purge tube. The pintle can be moveable between a closed position preventing the draining of the at least one liquid and preventing the purging of the at least one gas, a first open position allowing the draining of the at least one liquid while preventing the purging of the at least one gas from the purge tube, and a second open position allowing the draining of the at least one liquid drainage from the sump and allowing the purging of the at least one gas from the purge tube. The device can be configured such that upon closing via actuation of the pintle, a seal retainer is engaged to lead to the gas sealing. The seal retainer can enclose one, two, or three or more O-rings which compress and create a seal against the pintle.

BRIEF DESCRIPTION OF THE FIGURES

The following detailed description of specific embodiments can be best understood when read in conjunction with the following drawings, where like structure is indicated with like reference numerals and in which.

Figure 1A:
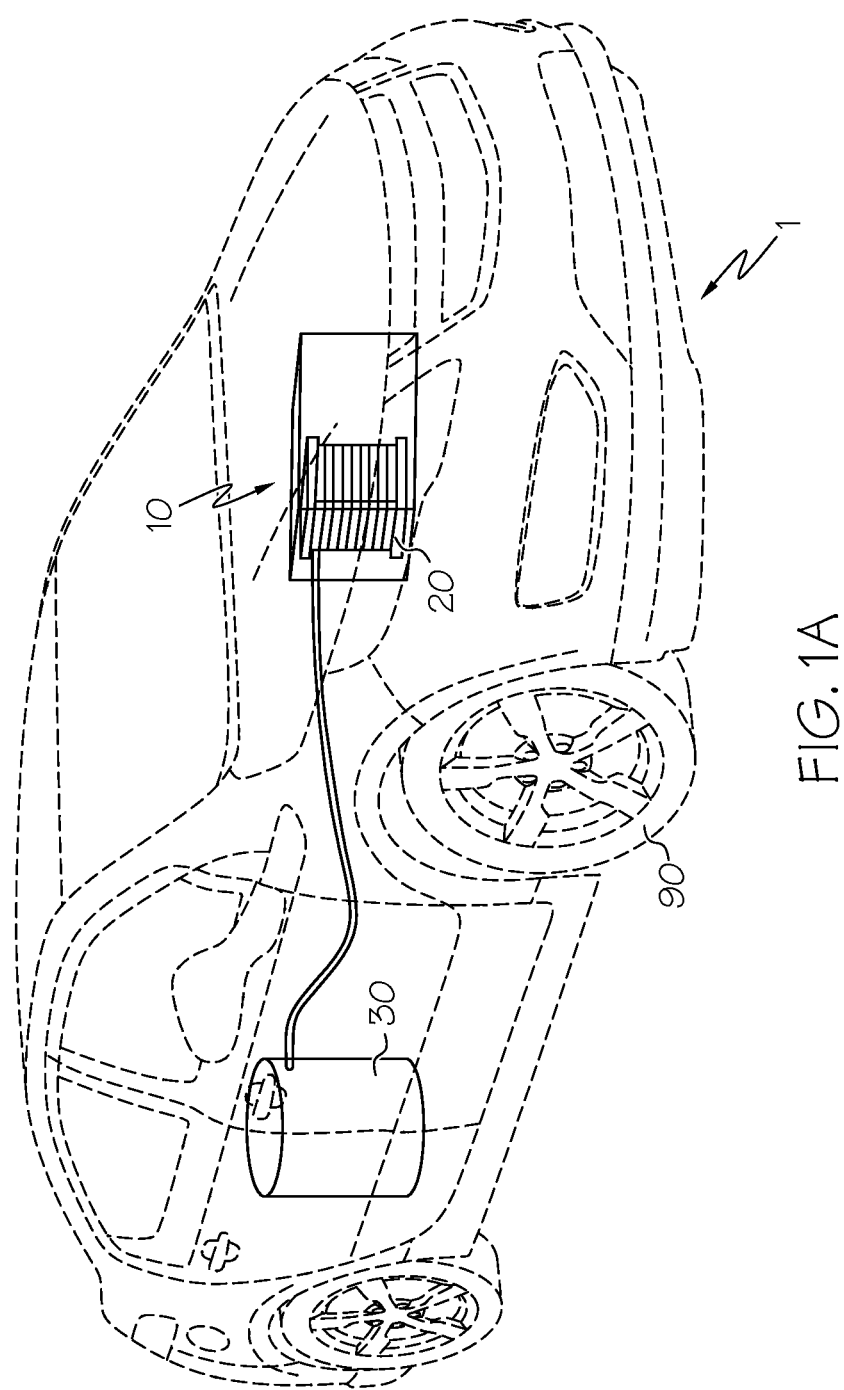
FIG. 1A shows a vehicle having a fuel cell system with at least one fuel cell stack.

The embodiments set forth in the drawings are illustrative in nature and are not intended to be limiting of the embodiments defined by the claims. Moreover, individual aspects of the drawings and the embodiments will be more fully apparent and understood in view of the detailed description that follows.

DETAILED DESCRIPTION

Specific embodiments of the present disclosure will now be described. The invention may, however, be embodied in different forms and should not be construed as limited to the embodiments set forth herein. Rather, these embodiments are provided so that this disclosure will be thorough and complete, and will fully convey the scope of the invention to those skilled in the art.

Unless otherwise defined, all technical and scientific terms used herein have the same meaning as commonly understood by one of ordinary skill in the art to which embodiments of this invention belong. The terminology used herein is for describing particular embodiments only and is not intended to be limiting of the invention. As used in the specification and appended claims, the singular forms "a," "an," and "the" are intended to include the plural forms as well, unless the context clearly indicates otherwise.

Unless otherwise indicated, all numbers expressing quantities of ingredients, reaction conditions, and so forth as used in the specification and claims are to be understood as being modified in all instances by the term "about," which is intended to mean up to ±10% of an indicated value. Additionally, the disclosure of any ranges in the specification and claims are to be understood as including the range itself and also anything subsumed therein, as well as endpoints. Unless otherwise indicated, the numerical properties set forth in the specification and claims are approximations that may vary depending on the desired properties sought to be obtained in embodiments of the present invention. Notwithstanding that numerical ranges and parameters setting forth the broad scope of embodiments of the invention are approximations, the numerical values set forth in the specific examples are reported as precisely as possible. Any numerical values, however, inherently contain certain errors necessarily resulting from error found in their respective measurements.

Parts of methods described herein such as mathematical determinations, calculations, inputting of data for computations or determinations of equations or parts thereof can be performed on parts of or one or more computers or computer systems that can include one or more processors, as well as software to run or execute programs and run calculations or computations.

Methods and systems and parts thereof described herein can be combined so as to implement embodiments of the invention. Forms of words used herein can have variations: for example a word such as "seal" is used, and implies herein that the seal can be used for "sealing."

Figure 1B:
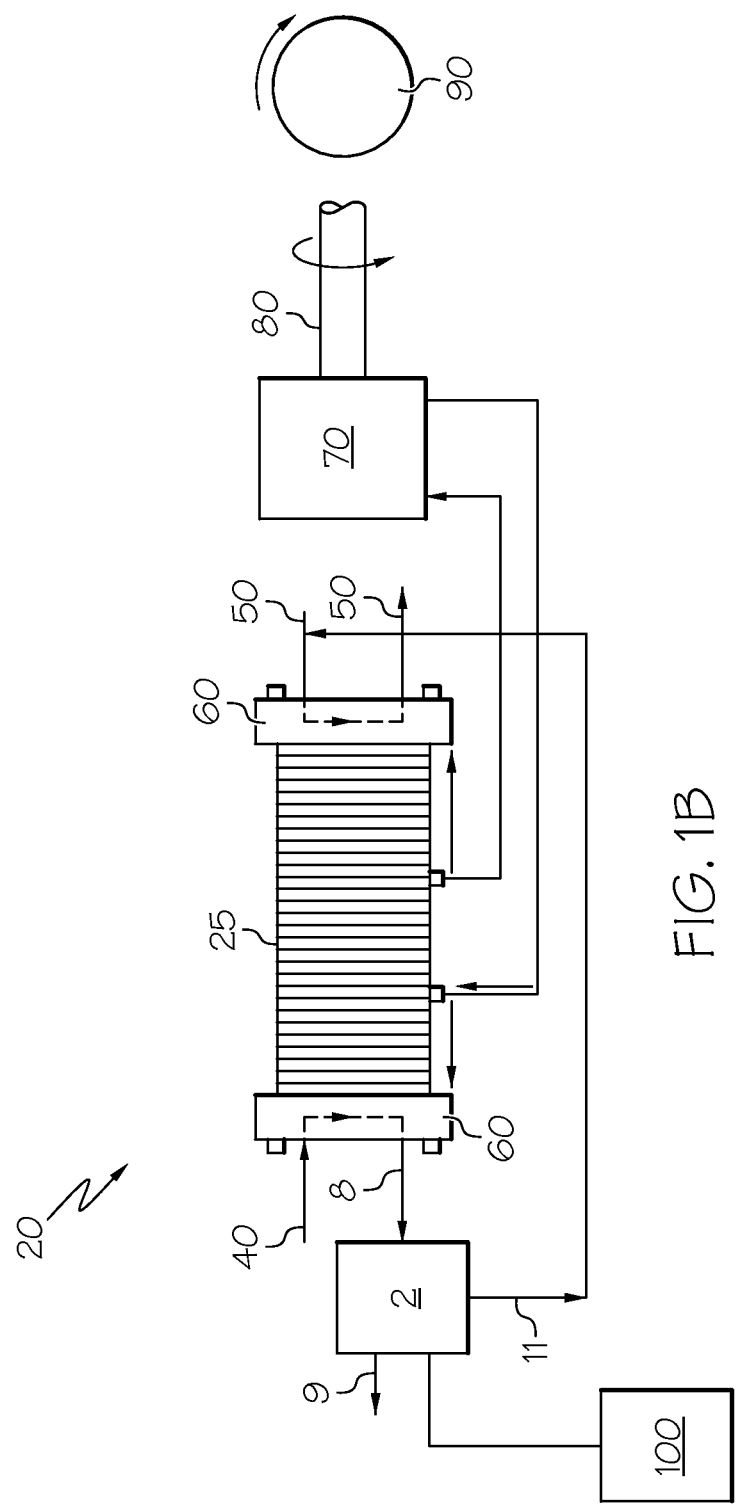
FIG. 1B shows a schematic illustration of the interrelation between the fuel cell stack and a drivetrain of the vehicle of FIG. 1A.
Figure 1C:
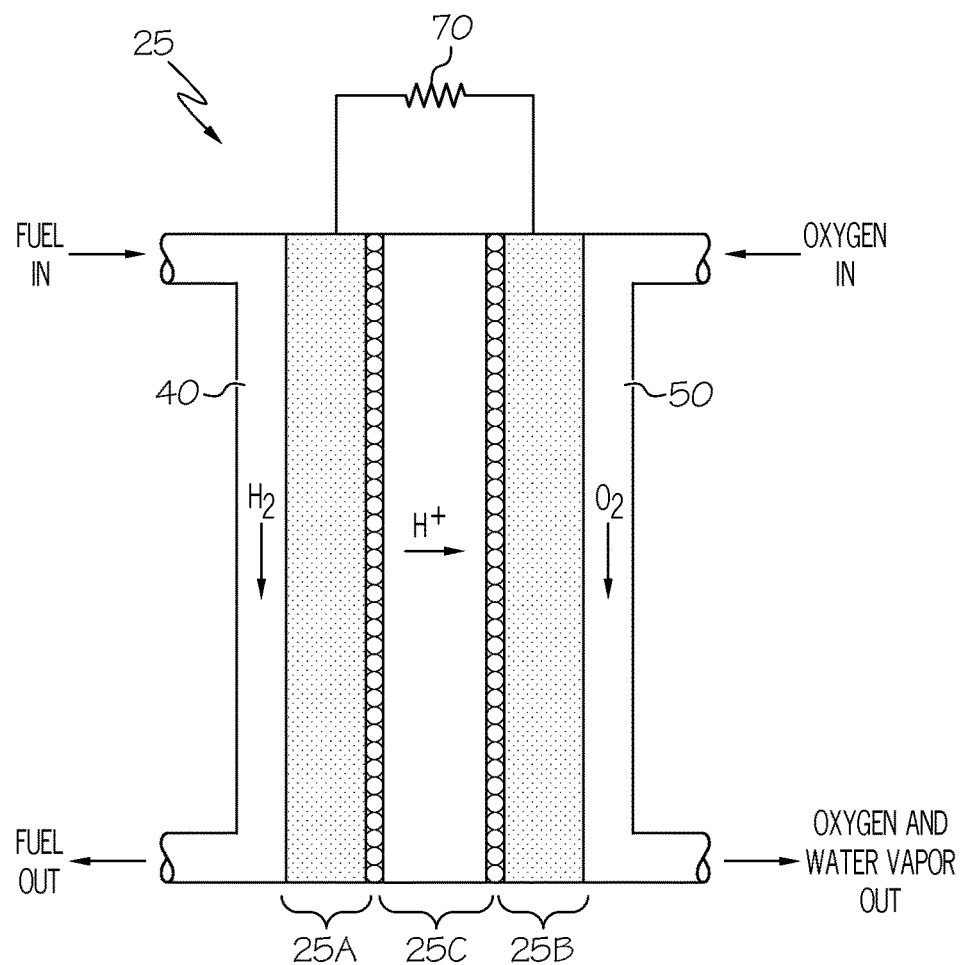
FIG. 1C shows a representative single fuel cell that is used to make up the fuel cell stack of FIG. 1B.

Referring first to FIGS. 1A through 1C, a vehicle 1 includes a propulsion source in the form of a fuel cell system 10 with one or more fuel cell stacks 20 being supplied with fuel from one or more tanks 30. In one form, the fuel is in the form of a hydrogen-based first reactant. The second reactant (for example, an oxygen-based fluid) may be supplied from the ambient environment. Either or both reactants may be supplied to the fuel cell system 10 in pressurized form, such as by a compressor, pump or related device (not shown). Although not shown, an additional propulsion source, such as a conventional internal combustion engine (ICE) or a battery pack, may also be used to give the vehicle 1 hybrid propulsion attributes.

Fuel cell stack 20 (FIG. 1B) is made up of numerous individual fuel cells 25 (FIG. 1C) that in turn are each made up of an anode 25A, cathode 25B and a proton-transmissive membrane 25C. A first reactant flowpath 40 acts as a conduit to convey a hydrogen-bearing fluid to and from all of the anodes 25A, while a second reactant flowpath 50 does the same with an oxygen-bearing fluid at all of the cathodes 25B. Manifolds 60 may be disposed at opposing ends of stack 20 to coordinate the delivery and removal of the reactants through the conduits 40, 50. Energy conversion devices 70 can be in the form of a load made up of one or more batteries, capacitors, electricity converters, or even a motor to convert the electric current coming from the fuel cell stack 20 into rotating shaft power that can be used to operate a drivetrain 80 and one or more motive devices (such as a wheel) 90. The energy conversion devices 70 are not necessary to the operation of the system 1, and may be done away with a certain configurations. Together, the anode 25A cathode 25B and membrane 25C define a membrane electrode assembly (MEA).

FIG. 1B also illustrates the cathode catalytic heating system 2 which couples reactant flowpath 40 to the reactant flowpath 50 providing for gaseous exchange. Arrows illustrate the interaction of the energy conversion device 70, the individual fuel cells 25, and the catalytic heating system 2. Also illustrated are the gas flowpaths 8, 9, and 11, and a controller 100 for methods and devices described herein (such as for sending signals to actuate the pintle up or down).

Figure 2:
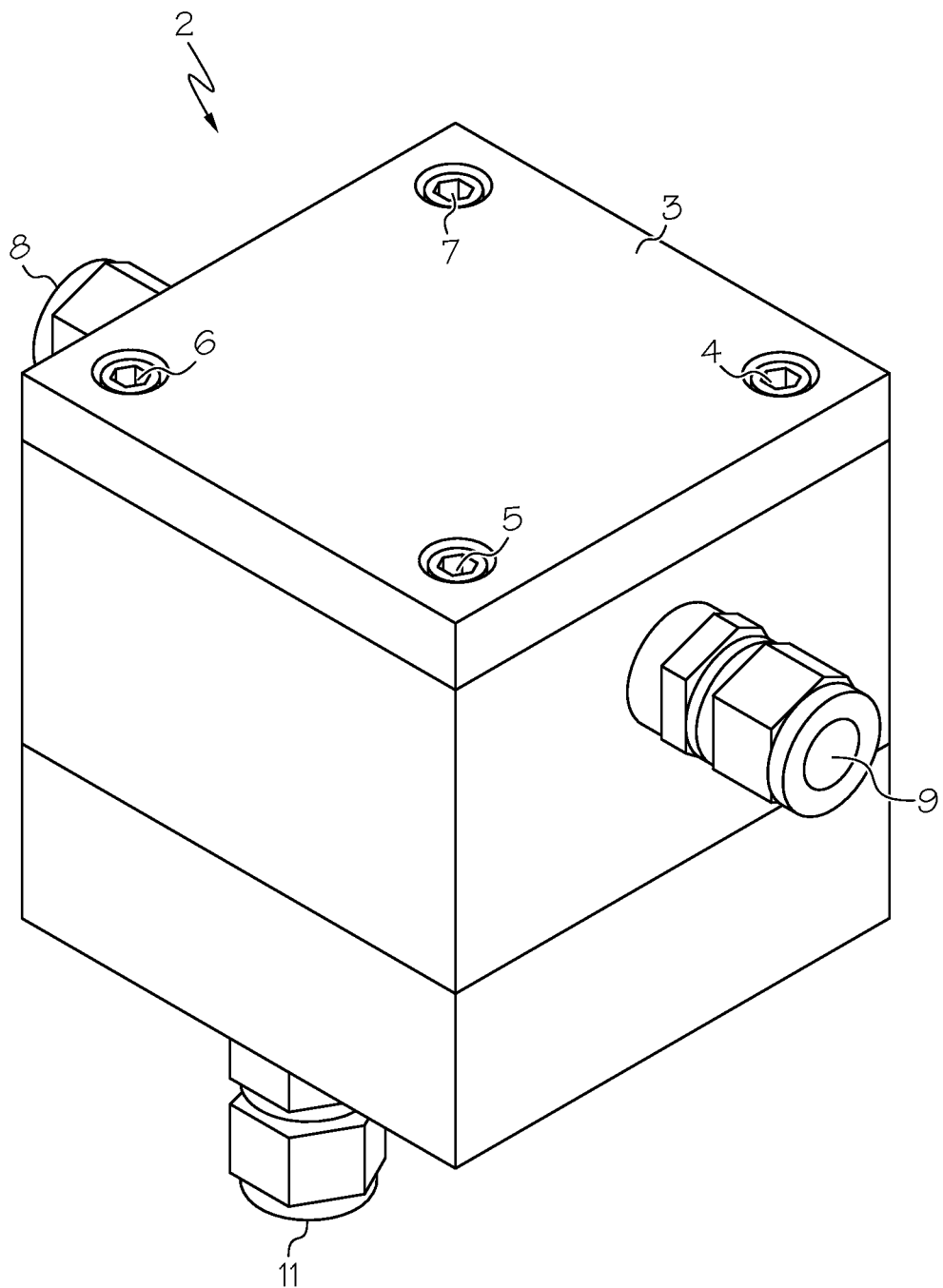
FIG. 2 illustrates the cathode catalytic heating system.
Figure 3:
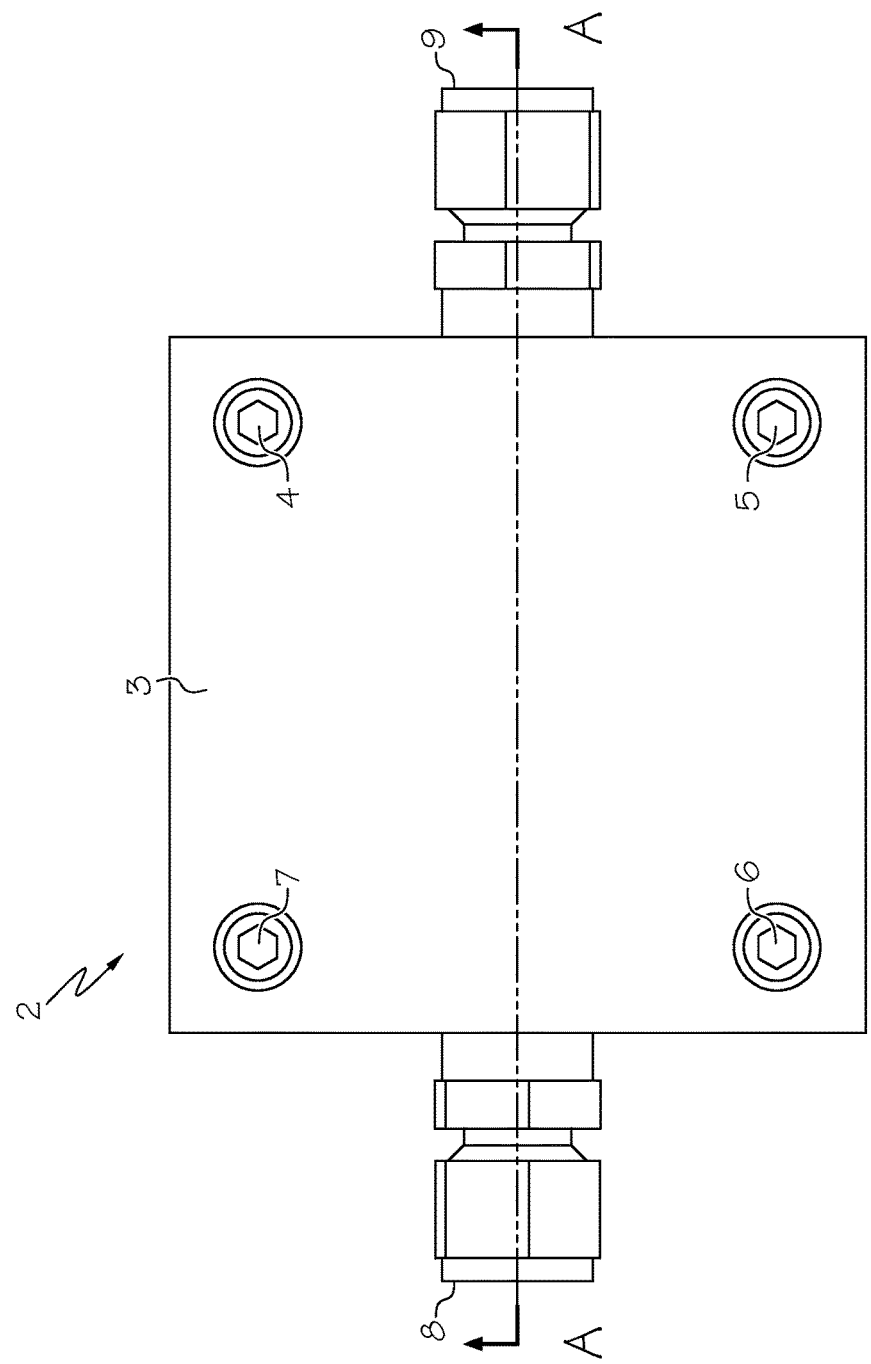
FIG. 3 illustrates a top view of the cathode catalytic heating system.

FIG. 2 illustrates an orthogonal view of the cathode catalytic heating system 2, and FIG. 3 illustrates a top view of the cathode catalytic heating system 2, with a top 3 and points of attachment 4, 5, 6, 7, to a main housing, as well as a gas flowpaths 8, 9. In specific embodiments the top 3 is coupled with nails, screws, or other affixations known in the art. In specific embodiments the corners are attached to the main housing, as shown in FIG. 3, and in others the attachments number from about 1 to about 5 or from about 1 to about 10, and can be spaced equally or unequally spaced along the edges of the top. Such is shown in FIG. 2, which also depicts the gas flowpath 11.

Figure 4:
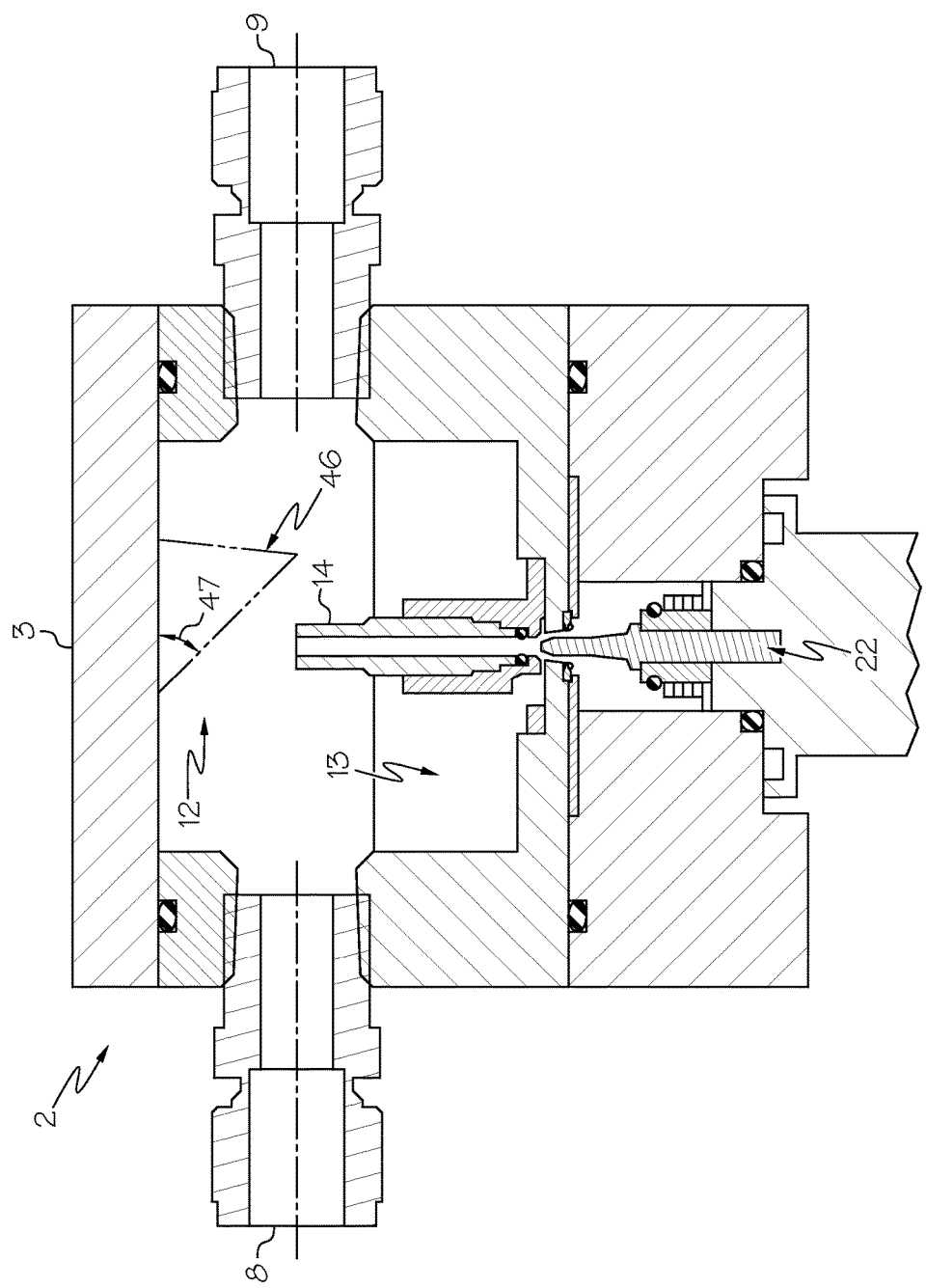
FIG. 4 illustrates a cross sectional view of the cathode catalytic heating system along line A-A of FIG. 3, illustrating the anode drain, purge tube, sump, and pintle.

FIG. 4 illustrates a cross sectional view of the cathode catalytic heating system 2 along line A-A of FIG. 3, illustrating the top 3, the sump 13, the gas flowpaths 8, 9, purge tube 14, pintle 22, and anode drain 12 (also herein the anode gaseous drain). The anode drain 12 is indicated by the region between the top 3 and the sump 13 (and laterally between the gas flowpaths 8 and 9). In specific embodiments methods provided herein comprise preventing water from dripping into the purge tube 14 via placing of the top 3 onto the system 2. The shape of the top assures that water dripping from the bottom surface of the top does not fall into the purge tube 14. The top can have one or more angled surfaces 46 to direct the drips away from the purge tube 14 opening. The angle is sufficient to assure function regardless of operation or parking of the vehicle on typical inclines.

In FIG. 4 an embodiment of the angled surface 46 is illustrated, showing the top 2 having a substantially triangular section extending down from the main portion of the top 3 in the direction of the pintle 22. In specific embodiments the angled surface 46 is a detachable and/or re-attachable piece from the rest of the top 3. In specific embodiments the angled surface and the rest of the top 3 are formed of a single piece and/or are not detachable. In specific embodiments the angled surface 46 comprises a tubular structure having a diameter greater than that of the purge tube. In specific embodiments the angled surface 46, has an angle 47 from a plane of the main portion of the top 3 that is from about zero to about ninety degrees. In specific embodiments the angle 47 is from about twenty-five to about seventy-five degrees, and in others, from about zero to about forty-five degrees. In other embodiments the angle 47 is from about forty-five to about ninety degrees. In specific embodiments there are two or more angled surfaces 46, having the same or different angle 47. In specific embodiments the angled surface 46 extends from the bottom surface of the top 3 to below the purge tube 14 opening (in a direction substantially from the top 3 toward the pintle 22) such that water dripping from the bottom surface of the top cannot fall into the purge tube 14. The surface of the angled surface 46 is sufficiently smooth to prevent water droplets from forming with surface tension above the bottom point of the angled surface 46. A hydrophobic coating applied to the angle surface 46 can be added for additional protection against droplets forming above and dropping into the purge tube 14 opening.

Figure 5:
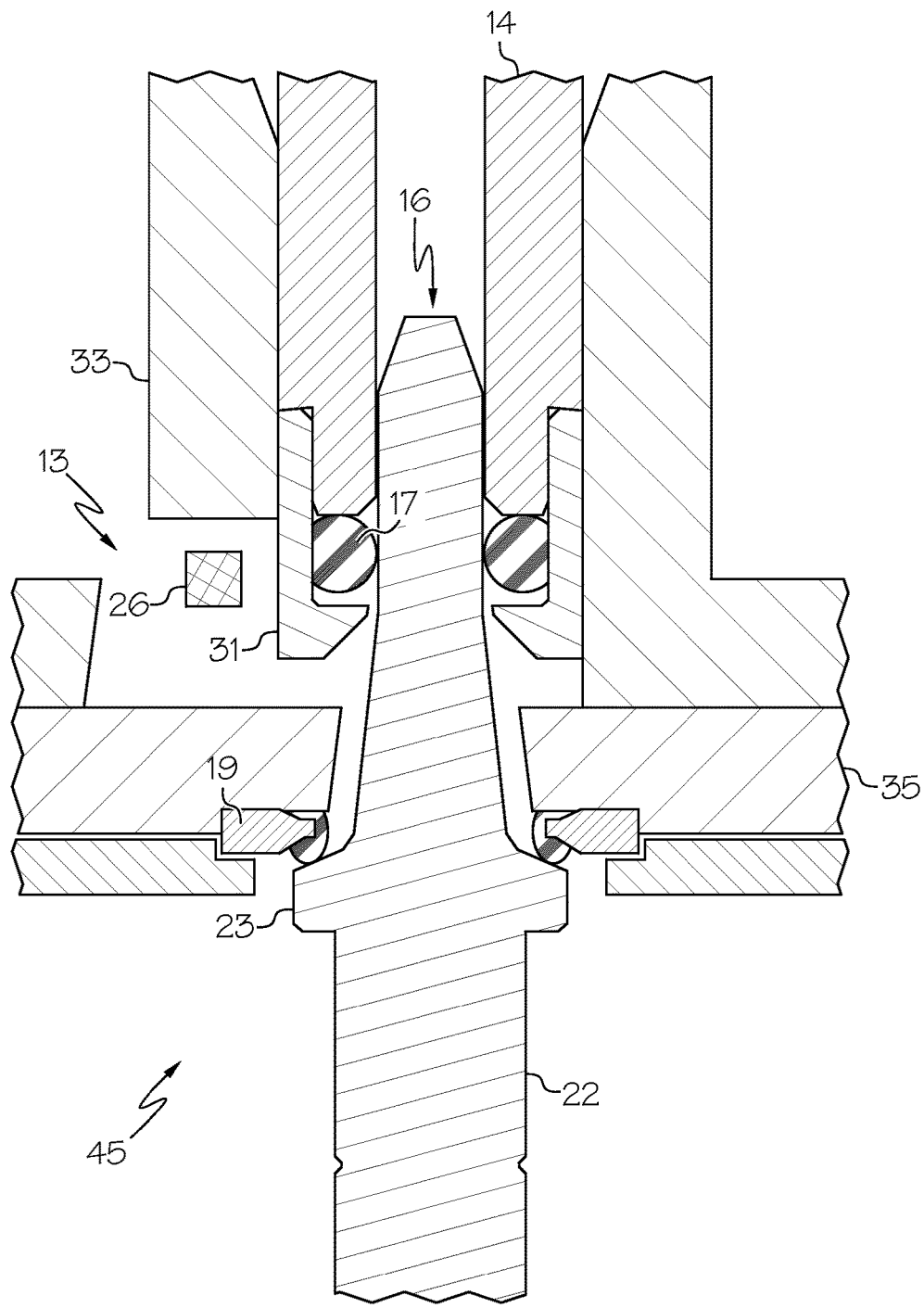
FIG. 5 illustrates an enlarged view of the cathode catalytic system in cross-section, illustrating the pintle in the closed position, as well as an O-ring coupled to the end of the purge tube.
Figure 6:
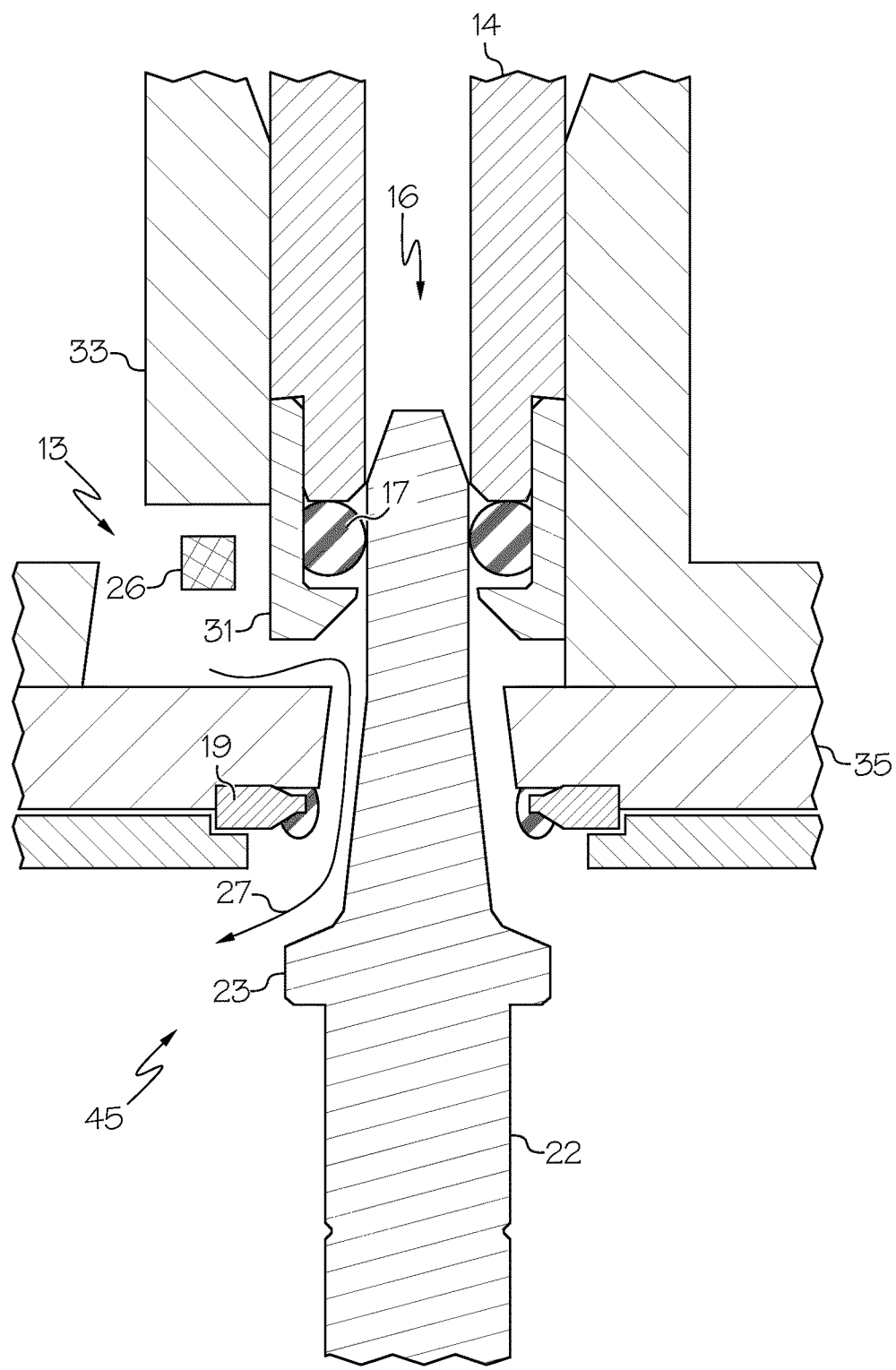
FIG. 6 illustrates the enlarged view of the cathode catalytic system in cross-section with the pintle in the first open position.
Figure 7:
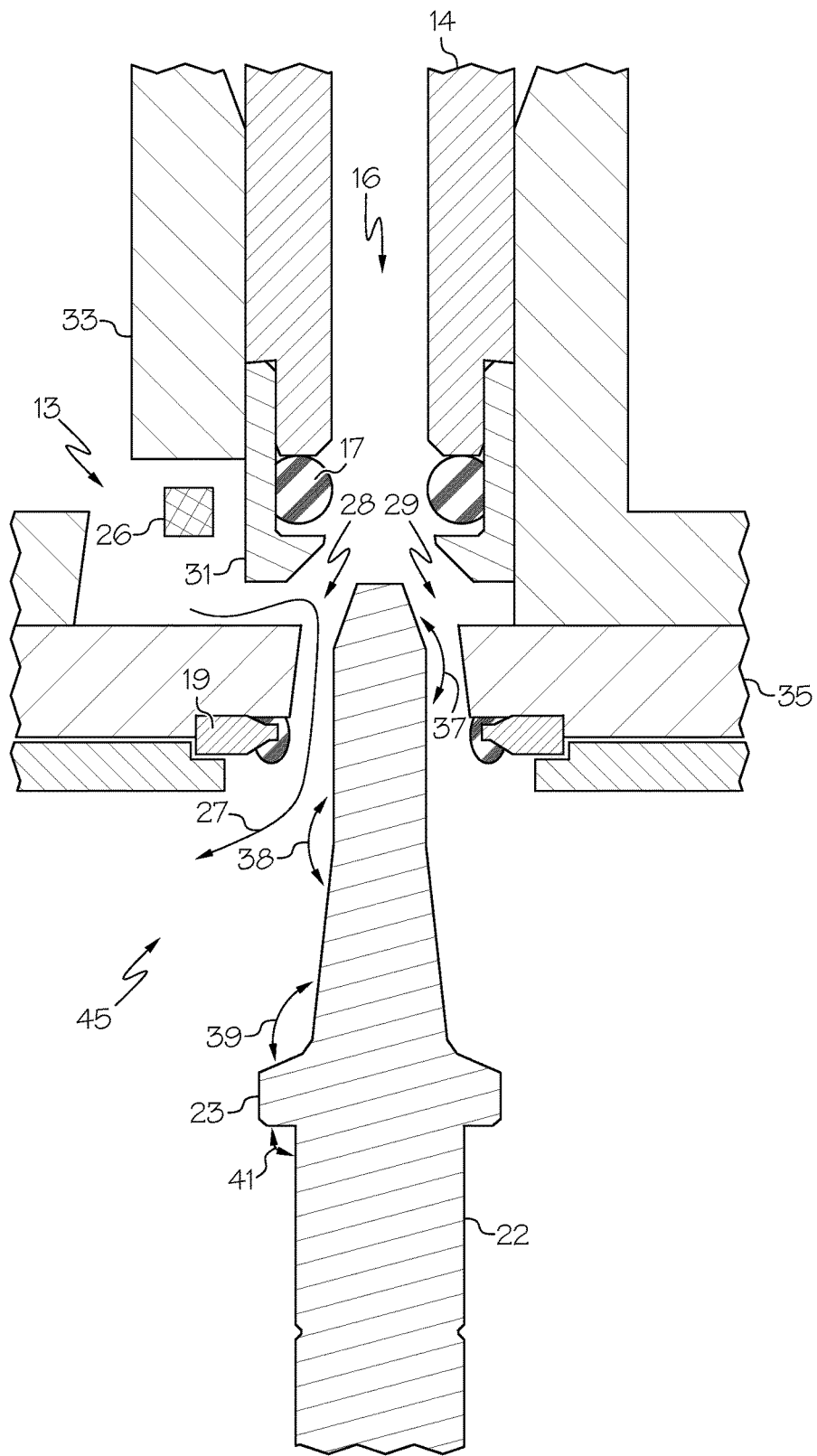
FIG. 7 illustrates the enlarged view of the cathode catalytic system in cross-section with the pintle in the second open position.

FIGS. 5, 6, and 7 illustrate an enlarged view of the cathode catalytic system 2 in cross-section, illustrating the pintle 22 and shoulder 23, as well as O-ring 17 coupled to the end of the purge tube 14, and the lumen 16 of the purge tube 14, for gas movement toward the pintle 22. Also illustrated is the sump 13, an example of an ice formation 26, seal retainer 31, and lower seal 19 that prevents liquid drainage from the sump 13 to the cathode drain 45 indicated by the region around the lower part of the pintle 22 (and in specific embodiments surrounding the lower part of the pintle 22). In specific embodiments the cathode drain 45 is the region at or below the level of the shoulder 23 of the pintle 22 when the pintle 22 is in the closed position. The liquid drainage is sealable at least in part through the lower seal 19. The direction of flow of liquid from the sump 13 to the cathode drain 45 is shown in FIGS. 6 and 7 at 27, and the direction of flow of gas is shown in FIG. 7 at 28, 29. FIG. 5 illustrates the pintle in the closed position, FIG. 6 illustrates the pintle in the first open position, and FIG. 7 illustrates the pintle 22 in the second open position. In specific embodiments the O-ring 17 is an upper seal, at least one upper seal, or an O-ring system with an upper seal or upper seals that are gas impermeable. The O-ring 17 can be deformable. In specific embodiments the pintle 22 slides entirely into the upper seal at the site of the O-ring 17 shown in FIG. 5, the upper seal surrounding the pintle. In other embodiments the pintle 22 contains the upper seal around it that deforms and seals upon compression against the walls of the purge tube 14 as the pintle 22 actuates into the purge tube 14. In specific embodiments the purge tube 14 is up to 0.5 inches in diameter. FIGS. 5-7 also illustrate the substantially vertical assembly part 33 and the substantially horizontal assembly part 35. FIG. 7 also include angles 37, 38, and 39, 41 of the pintle 22, which is shaped so as to create the gas and liquid sealing as described in association with parts described herein. In specific embodiments methods provided herein comprise actuating the pintle 22 from the first open position to the second open position, and removing recycled hydrogen by the purging of the at least one gas. In specific cases the purged gas is hydrogen. In other cases, the gas is oxygen. In yet other cases, the gas is at least a percentage of hydrogen or oxygen, or both. In yet other cases, the gas is at least a percentage of hydrogen or nitrogen, or both.

More specifically regarding the upper seal, as previously indicated, the upper seal can be gas impermeable. In certain embodiments the O-ring 17 can be coupled to the purge tube 14 and abut the pintle 22 when in the closed position thus forming a point between a surface of each of the at least one O-ring 17 and a surface of the pintle 22, the point being impermeable to gas when the pintle 22 is in the closed position and when the pintle 22 is in the first open position. In specific embodiments 2, 3, 4, 5, 6, 7, 8, 9, or 10 or more O-rings 17 are used and can be equally spaced. The O-rings can be separate from or used with STAT-O-SEAL® products such as an O-ring. In specific embodiments the upper seal surrounds the bottom of the lumen 16 of the purge tube 14 into which the pintle 22 enters, thus entirely surrounding and sealing around the pintle 22 such that an impermeable barrier to gas is created where the upper seal rests against the pintle 22 once upward movement stops; in such a case the pintle 22 can have a section of equal diameter, or can have a diameter such that a lower sections of the pintle 22 is wider, and as the pintle 22 moves into place (actuating upward into the purge tube 14) it force fits against the upper seal (which can be an O-ring in specific embodiments) 17 pushing it against a wall of the purge tube 14 in either an upwards or outward (laterally) direction, or both, to cause the sealing. The upper seal, such as an O-ring 17 can be located at the bottom of the purge tube 14 or within the purge tube 14 or there can be one or more upper seals (such as O-rings but not limited thereto) 17 inside the purge tube 14 and one or more seals outside the purge tube 14 but coupled to the bottom end of the purge tube 14. The seal retainer 31 can be configured to be coupled to the purge tube itself or to the substantially vertical assembly part 33 located laterally from the purge tube 14, or both. The substantially vertical assembly part 33 can be coupled to the purge tube 14.

Regarding the lower seal 19, in specific embodiments the lower seal 19 abuts the pintle 22 at a surface of the pintle 22 when the pintle 22 is in the closed position thus forming an area between a surface of the lower seal 19 and the surface of the pintle 22, the area impermeable to a movement of liquid. The lower seal can prevent the movement of liquid from the sump 13 to the cathode drain 45. In specific embodiments the lower seal 19 is one two, or more of a STAT-O-SEAL®. In specific embodiments 2, 3, 4, 5, 6, 7, 8, 9, or 10 or more seals are used to provide the sealing. In specific embodiments one or more of the lower seal 19 can comprise one or more O-rings which can be a synthetic rubber O-ring mechanically locked to a washer such as an aluminum washer; in specific embodiments, when tightened, the O-ring can be compressed, forcing the sealing surfaces around a bolt shank, with the O-ring forming in specific embodiments a positive seal. In specific embodiments the positive seal can function over a temperature range of about negative 85 degrees to about positive 450 degrees Fahrenheit. In specific embodiments the lower seal 19 can be smooth or have grooves. In specific embodiments a copper or aluminum sealing washer can be used with or in place of an O-ring. In specific embodiments, the pintle 22 can be actuated from one of the open positions to the closed position, and the shoulder 23 of the pintle 22 can be actuated upward, compressing an O-ring, forming a seal impermeable to liquid.

Regarding actuation of the pintle 22, the pintle 22 can be actuated from about 1 to about 9 millimeters as the total distance in moving from the closed position to the first open position and then to the second open position. In specific embodiments the pintle 22 actuates from about 1 to about 4 millimeters, and in others, actuates from about 1 to 2 millimeters. In specific embodiments the pintle 22 moves from about 1, 2, 3, 4, 5, 6, 7, 8, 9, or 10 millimeters in distance upon actuating. In specific embodiments the actuation distance from the closed position to the first open position can be about one-third of the total distance from the closed position to the second open position; in others, it can be up to one-half of the distance, or from about one-third to about one half the distance.

In specific embodiments the pintle 22 can be actuated substantially linearly to move between the closed position, the first open position, and/or the second open position. The pintle 22 can be actuated from either the closed position to the first open position (allowing liquid to drain from the sump in warm conditions), or from the first open position to the second open position to remove gaseous hydrogen for Cathode Catalytic Heating (CCH) in case up to about fifty cubic centimeters of ice in the sump 13 is blocking the lower flow path 27. The pintle 22 can be actuated/moved repeatedly between any of the positions described herein. The pintle 22 can be actuated from the closed position to the first open position and from the first open position to the second open position, such that gas moves through the lumen of the purge tube, warming the pintle 22 and/or the sump 13, melting ice in the sump 13 and/or melting ice attached to the pintle 22, leading to draining of the at least one liquid resulting from the melted ice.

Still regarding actuation of the pintle 22, in specific embodiments ice forms in the sump 13 and/or around the pintle 22, therefore adding resistance to pintle 22 movement or even holding the pintle 22 in place in the closed position. In specific cases, actuation of the pintle 22 involves movement of the pintle 22 linearly despite ice, providing enough actuation force to break apart the ice and allow pintle 22 movement. In others, a motor (such as an example embodiment with the motor coupled to the bottom of the pintle) has difficulty moving the pintle or is not capable of actuating the pintle 22 because of the ice, and warming of the sump 13 and/or the pintle 22 is necessary. The motor can be a stepper motor or other motor known in the art, and can include a solenoid, and the pintle can be attached to a shaft such as an iron/steel shaft so that movement can be provided substantially linearly. As such, there is a need to move the pintle 22 from the closed position to the first open position and to the second open position. This allows gas such as hydrogen to move down the lumen 16 of the purge tube 14, warming system parts such as the sump 13 and/or the pintle 22, and melting the ice to allow draining of the liquid. In specific embodiments, in order to get the gas to flow and warm up the system, the pintle 22 needs to break free from the closed position. As such, force can be provided to the pintle 22 in a linear direction upward (not shown) toward the top 3 prior to the movement of the pintle from the closed position to the first open position; such force can be provided at a cold start even when the pintle 22 is already in the closed position, with or without ice formed thereupon. When ice is present, upward force applied to the pintle 22 can provide selective engagement between the pintle 22 and the lower seal 19 and/or the O-ring/upper seal 17 such that ice therebetween is physically fully or partially broken, or melted from the application of the force. The movement in specific embodiments is enough to actually compress the upper seal 17 and/or the lower seal 19, however the distance moved upward by the pintle is a small fraction of the total distance that the pintle moves between the closed and open positions; this ensures the integrity of the seals 17, 19. As such, with ice present and the upward force provided to the pintle 22, the time to move the pintle 22 downward from the closed position upon a cold start is about two seconds or less. In specific embodiments, software (such as embodied on a controller 100) coupled to pintle 22 is configured to send signals to actuate the pintle upward during a cold start even when the pintle 22 is in the closed position, then sends a signal to actuate the pintle 22 from the closed position to the first open position and/or the second open position. In specific embodiments the controller has settings and can send signals for the pintle positions of closed, first-open, second open, as described herein; it can also have a setting for "above the closed position," such that signals can be sent to this fourth position when ice is present.

Methods and systems in accordance with the invention may be performed by the computer-based controller 100 (also referred to as a controller, a control device, a programmable control device or electronic control unit) that is capable of executing instructions organized into one or more program modules that are made up of dedicated hardware devices and corresponding software. Instructions for implementing any of the system manipulation functions in accordance with the invention (such as moving the pintle up or down between positions described herein, opening or closing valves, turning pumps or compressors on or off (as well as speeding them up or down) and conveying sensed data and diagnostic function information) may be tangibly embodied in any suitably-configured embodiments of the various devices or components that make up the controller 100, including being placed resident on a memory portion thereof.

In a preferred form, controller 100 is configured as automated data processing equipment, such as that associated with a digital computer. In such case, it includes one or more of an input, an output, a processing unit (often referred to as a central processing unit (CPU)) and memory that can temporarily or permanently store such a code, program or algorithm in the controller's memory such that the instructions contained in the code are operated upon by the processing unit based on input data such that output data generated by the code and the processing unit can be conveyed to another program or a user via output. As such, controller 100 becomes particularly-adapted in order to perform at least some of the data acquisition, manipulation or related computational functions needed to provide prompt, efficient movement of the pintle and control of liquid and gas.

In a particular form, the computer-readable program code that contains the algorithms and formula needed to perform the sensing and controlling functions outlined above can be loaded into suitable portions of controller 100 memory. Such computer-readable program code may also be formed as part of an article of manufacture such that the instructions contained in the code are situated on a magnetically-readable or optically-readable disk or other related non-transitory, machine-readable medium, such as flash memory device, CDs, DVDs, EEPROMs, floppy disks or other such medium capable of storing machine-executable instructions and data structures. Such a medium is capable of being accessed by controller 100 or other electronic device having a processing unit used for interpreting instructions from the computer-readable program code. Together, the processor and any program code configured to be executed by the processor define a means to perform one or more of the control functions discussed herein. As will be understood by those skilled in the computer art, the controller 100 may include additional chipsets, as well as a bus and related wiring for conveying data and related information between its processing unit and other internal devices (such as input, output and memory devices) and external devices.

The pintle 22 can be configured to be shaped to have a section of at least a first width extendable substantially linearly within the purge tube 14, a portion of which is configured to engage at least the upper seal (such as an O-ring) 17 coupled to the purge tube 14 to create a point impermeable to the at least one gas, and the pintle 22 has a second section of at least a second width, the at least a second width being wider than a diameter of the purge tube 14.

The pintle 22 can be configured such that it has a shoulder 23, configured to abut the lower seal 19. In specific embodiments the lower seal 19 can be coupled to the device below the sump 13. The pintle 22 can have zero, one, two, or three shoulders; alternatively it can have from about zero to about five or from about five to about ten shoulders. In specific embodiments the shoulder 23 can extend out laterally from the pintle 22, and can be sloped upward or downward so as to engage the lower seal 19. The shoulder 23 can extend out laterally from the main body of the pintle 22, having a downward slope (toward the bottom of the pintle 22). In specific embodiments the pintle 22 is formed of a single piece, though in specific embodiments the shoulder 23 could be reversibly couplable to the main body of the pintle 22. In specific embodiments, when actuated to the closed position, the pintle 22 can engage one or more substantially horizontal assembly parts 35; in specific embodiments horizontal assembly part 35 can be shaped to have a side so as to mirror the shape of the pintle 22 at the engagement point and form fit against one another. In specific embodiments the angle 41 (illustrated in FIG. 7) between the longitudinal axis of the pintle (a line leading substantially up through the purge tube) is about ninety-degrees to a line across the bottom of each extension of the protrusion. In specific embodiments angle 41 can be from about zero to about ninety degrees, and in other embodiments from about zero to about forty-five degrees, or from about zero to about one-hundred twenty degrees. Other angles shown in FIG. 7 include angles 37, 38, and 39. In specific embodiments angle 37 can be greater than about one-hundred eighty degrees. In specific embodiments angle 38 can be less than about one-hundred eighty degrees. In specific embodiments angle 39 can be from about zero to about one-hundred twenty degrees. The pintle 22 at angle 39 can also be curved in shape.

Having described embodiments of the invention in detail, it will be apparent that modifications and variations are possible without departing from the scope of the invention defined in the appended claims. More specifically, although some aspects of the present invention are identified herein as preferred or particularly advantageous, it is contemplated that the present invention is not necessarily limited to these preferred aspects of the invention.

What is claimed is:

1. A method for improving cathode catalytic heating by allowing independently for a draining of at least one liquid comprising water and a purging of at least one gas in a fuel cell at cold starts, the method comprising:
    providing a cathode catalytic heating system comprising;
        an anode drain and a cathode drain coupled by a purge tube there between, the purge tube configured to purge at least one gas from the anode drain to the cathode drain;
        a sump external to the purge tube, the sump configured to drain the at least one liquid from the sump to the cathode drain; and
        a pintle selectively disposed within the purge tube, the pintle moveable between a closed position, a first open position, and a second open position, the closed position configured to inhibit draining of the at least one liquid from the sump and inhibit purging of the at least one gas from the purge tube, the first open position configured to allow draining of the at least one liquid from the sump and inhibit purging of the at least one gas from the purge tube, the second open position configured to allow draining of the at least one liquid from the sump and allow purging of the at least one gas from the purge tube;
    actuating the pintle from the closed position to the first open position; and
    draining the at least one liquid from the sump to the cathode drain.

2. The method of claim 1, further comprising actuating the pintle from the first open position to the second open position, and removing recycled hydrogen by the purging of the at least one gas.

3. The method of claim 2, further comprising actuating the pintle from about 1 millimeter to about 9 millimeters as a total distance in moving from the closed position to the first open position and then to the second open position.

4. The method of claim 1, further comprising preventing the purging of the at least one gas by an upper seal coupled to the purge tube and abutting the pintle at a surface of the pintle when the pintle is in the closed position thus forming a point between an upper seal surface and the surface of the pintle, the point being impermeable to the at least one gas when the pintle is in the closed position and when the pintle is in the first open position.

5. The method of claim 1, further comprising preventing the purging of the at least one gas via at least one O-ring coupled to the purge tube and abutting the pintle at a surface of the pintle when the pintle is in the first open position and when the pintle is in the closed position, thus forming a point between a surface of the at least one O-ring and the surface of the pintle, each point being impermeable to gas when the pintle is in the closed position and when the pintle is in the first open position.

6. The method of claim 1, further comprising preventing the draining of the at least one liquid via a lower seal abutting the pintle at a surface of the pintle when the pintle is in the closed position thus forming an area between a lower seal surface and the surface of the pintle, the area impermeable to a movement of the at least one liquid and preventing the movement of the at least one liquid from the sump to the cathode drain.

7. The method of claim 1, further comprising preventing water from dripping into the system via placing of a top onto the system wherein the top has an angled surface configured to prevent water from dripping into the purge tube, the angled surface comprising a hydrophobic coating thereupon to protect against droplet formation.

8. The method of claim 1, further comprising actuating the pintle substantially linearly to move between the closed position, the first open position, or the second open position.

9. The method of claim 1, further comprising actuating the pintle from the first open position to the second open position, such that gas moves through a lumen of the purge tube to melt ice in the sump or attached to the pintle.

10. The method of claim 9, further comprising providing a force to the pintle in a linear direction upward toward a top of the cathode catalytic heating system prior to movement of the pintle from the closed position to the first open position, leading to physical breaking of the ice.

11. A system for improving cathode catalytic heating by allowing independently for a draining of at least one liquid comprising water and a purging of at least one gas in a fuel cell at cold starts comprising:
an anode drain and a cathode drain coupled by a purge tube there between, the purge tube configured to purge at least one gas from the anode drain to the cathode drain;
a sump external to the purge tube, the sump configured to drain the at least one liquid from the sump to the cathode drain; and
a pintle selectively disposed within the purge tube, the pintle moveable between a closed position, a first open position, and a second open position, the closed position configured to inhibit draining of the at least one liquid from the sump and inhibit purging of the at least one gas from the purge tube, the first open position configured to allow draining of the at least one liquid from the sump and inhibit purging of the at least one gas from the purge tube, the second open position configured to allow draining of the at least one liquid from the sump and allow purging of the at least one gas from the purge tube.

12. The system of claim 11, further comprising an upper seal coupled to the purge tube and abutting the pintle at a surface of the pintle when the pintle is in the first open position and when the pintle is in the closed position, thus forming a point between a surface of the upper seal and the surface of the pintle, the point being impermeable to the at least one gas when the pintle is in the closed position and when the pintle is in the first open position.

13. The system of claim 11, further comprising at least one O-ring coupled to the purge tube and abutting the pintle when in the first open position and in the closed position thus forming a point between a surface of each of the at least one O-ring and a surface of the pintle, the point being impermeable to the at least one gas when the pintle is in the closed position and when the pintle is in the first open position.

14. The system of claim 11, further comprising a lower seal abutting the pintle at a surface of the pintle when the pintle is in the closed position thus forming an area between a surface of the lower seal and the pintle surface, the area impermeable to a movement of the at least one liquid and preventing the movement of the at least one liquid from the sump to the cathode catalytic heating system.

15. The system of claim 14, wherein the pintle is configured such that it has a shoulder configured to abut the lower seal coupled to the device below the sump.

16. The system of claim 11, wherein the pintle is configured to be shaped to have a section of at least a first width extendable substantially linearly within the purge tube, a portion of which is configured to engage at least an upper seal coupled to the purge tube to create a point impermeable to the at least one gas, and the pintle has a second section of at least a second width, the at least a second width being wider than a diameter of the purge tube.

17. The system of claim 11, wherein the system is configured such that a distance for movement of the pintle from the closed position to the first open position comprises about one-third of the total distance for movement of the pintle from the closed position to the second open position.

18. The system of claim 11, further comprising a top configured to prevent water from dripping into the system.

19. The system of claim 11, further comprising a top having an angled surface configured to prevent water from dripping into the purge tube, the angled surface comprising a hydrophobic coating thereupon to protect against droplet formation.

20. The system of claim 19, wherein the angled surface has an angle from a plane of the main portion of the top that is from about zero degrees to about forty-five degrees.

* * * * *